(12) United States Patent
Green et al.

(10) Patent No.: US 10,092,976 B2
(45) Date of Patent: Oct. 9, 2018

(54) MACHINING METAL REMOVAL CONTROL

(71) Applicant: Designers Edge Inc., Monroe, MI (US)

(72) Inventors: Daniel T. Green, Erie, MI (US);
Richard M. Zyla, Jackson, MI (US)

(73) Assignee: DESIGNERS EDGE INC., Monroe, MI (US)

( * ) Notice: Subject to any disclaimer, the term of this patent is extended or adjusted under 35 U.S.C. 154(b) by 355 days.

(21) Appl. No.: 14/469,145

(22) Filed: Aug. 26, 2014

(65) Prior Publication Data
US 2015/0060419 A1 Mar. 5, 2015

Related U.S. Application Data

(60) Provisional application No. 61/870,460, filed on Aug. 27, 2013.

(51) Int. Cl.
| | |
|---|---|
| *B23K 26/03* | (2006.01) |
| *B23K 26/38* | (2014.01) |
| *B23K 26/08* | (2014.01) |
| *B23K 26/14* | (2014.01) |
| *B23K 26/142* | (2014.01) |
| *B23K 26/0622* | (2014.01) |
| *B23K 26/40* | (2014.01) |
| *B23K 101/04* | (2006.01) |
| *B23K 103/04* | (2006.01) |
| *B23K 103/00* | (2006.01) |

(52) U.S. Cl.
CPC ........... *B23K 26/03* (2013.01); *B23K 26/032* (2013.01); *B23K 26/0622* (2015.10); *B23K 26/0823* (2013.01); *B23K 26/0869* (2013.01); *B23K 26/14* (2013.01); *B23K 26/142* (2015.10); *B23K 26/38* (2013.01); *B23K 26/40* (2013.01); *B23K 2201/04* (2013.01); *B23K 2203/04* (2013.01); *B23K 2203/50* (2015.10)

(58) Field of Classification Search
CPC .............. B23K 26/032; B23K 26/0823; B23K 26/0869; B23K 26/14; B23K 2201/04; B23K 2203/50
USPC ..................................................... 219/121.62
See application file for complete search history.

(56) References Cited

U.S. PATENT DOCUMENTS

| | | | |
|---|---|---|---|
| 5,200,593 A | 4/1993 | Rutkowski | |
| 5,384,446 A | 1/1995 | Rutkowski | |
| 6,311,099 B1 * | 10/2001 | Jasper | B23K 26/032 219/121.6 |
| 6,423,933 B2 * | 7/2002 | Nicholas | B23K 26/032 219/121.62 |

(Continued)

*Primary Examiner* — Dana Ross
*Assistant Examiner* — Kuangyue Chen
(74) *Attorney, Agent, or Firm* — Schaffer, Schaub & Marriott, Ltd.

(57) ABSTRACT

A process is disclosed for controlling the length of chips or shavings on materials that is inherent to produce long undesired chips when machined. Based on the work piece configuration and surface area to machine a determined outlay and process application for a continuous scribe or arrangements of different scribe pattern or patterns for the part and or surface is selected to provide optimal chip control during the machining operation. Engineered Interruptions are applied to the work object prior to the machining operation to maximize optimal chip control. Controlling the depth of scribe of the laser is accomplished and managed through the interface of hardware, software and electronics.

10 Claims, 12 Drawing Sheets

(56) References Cited

U.S. PATENT DOCUMENTS

| | | | | |
|---|---|---|---|---|
| 7,002,100 B2* | 2/2006 | Wu | ................... | B23K 26/0093 |
| | | | | 219/121.67 |
| 2012/0024827 A1* | 2/2012 | Shin | ..................... | B23P 25/006 |
| | | | | 219/121.61 |
| 2012/0138586 A1* | 6/2012 | Webster | ................ | A61B 18/20 |
| | | | | 219/121.64 |

* cited by examiner

MACHINING METAL REMOVAL CONTROL

CROSS REFERENCE TO RELATED APPLICATIONS

This application claims the benefit of U.S. provisional patent application Ser. No. 61/870,460 filed Aug. 27, 2013.

BACKGROUND OF THE INVENTION

This disclosure relates to a method of machining a work piece and means of controlling the lengths of chips or shavings from a work piece through the application of applying a pre-engineered interruption process to the surface of the work piece to foe machined using a laser with controlled the depth penetration.

In the machining process there are materials that are common in producing long or un-desired chip lengths known to cause problems. As an example, premature tool failure, equipment and machine damage, part scrap, lost production, reduced machining optimization, operator injury and excess capital equipment cost may occur. In the past, in order to address the negative results of undesired chip or shaving lengths, machine tool manufacturers have developed alternative methods to manage the problem. One example of a means of chip control is to utilize specially designed topography tooling. In most cases, these types of tools do have a level of success, providing that depth of cuts and feed rates are able to be applied, and material variations are within scope levels of variance and do not offset fixed machine tool operating parameters.

Another method to manage the length of chips is to apply high pressure cutting fluid to the area being machined so that the physical pressure causes the chip to break and to push away from the work piece. Although effective, this technique must take into account the cost to implement maintain and the possible dangers of a high-pressure jet system operating with a predetermined work area.

In another method, a machine is programmed so that the initial cut on the work object is a rapid scroll cut. As the machine tool and/or work object rotates, the machine tool advances into the work object at a depth and feed rate to cause a spiral out across the surface of the work object. However, this method of chip control does not deal with the long chip produced from the scroll cut. Also, the width of scribe causes a severe interruption to the machine tool. Added machine cycle time, premature tool failure and part deflection are also caused from scroll cutting.

This invention relates to a process including means for controlling the lengths of chips or shavings from a work piece surface through the application of applying a pre-engineered interruption process to the work piece to be machined using a laser beam or a Fluid Jet or a combination of both. The applied processes to the work piece will in effect provide break points or engineered interruptions within the surface area of the material that is selected and designated to be removed. The process is applied to the surface of the material of the work piece elected to be machined so that during the machining operation as the machine tool passes through the area treated, the chips or shavings created from the machine tool will sever. The teaching of this patent application are not limited to any particular types of lasers or laser manufacturers nor is this disclosure limited to how the laser or work objects are presented to each other via robotics, line feed, work holding, production automation, etc. In addition to substantial improvement in the teachings herein illustrate the means of controlling and or measuring the depth of penetration of the laser to meet determined depths to maximize chip control as the work object varies in rough or raw stage and so not to affect or disrupt what will become the finish surface after the machining operation of the work piece is concluded.

DETAILED DESCRIPTION OF THE PREFERRED EMBODIMENT(S)

Figure 1:
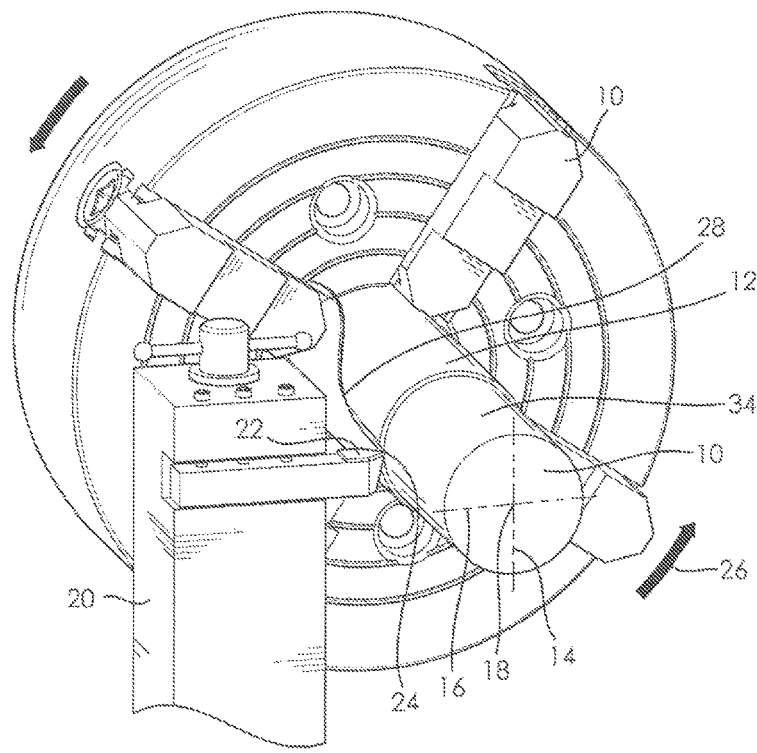
FIG. 1 illustrates a fragmentary end-view of the cylindrical part and tool holder and insert removing a relatively large length chip form the part.
Figure 2:
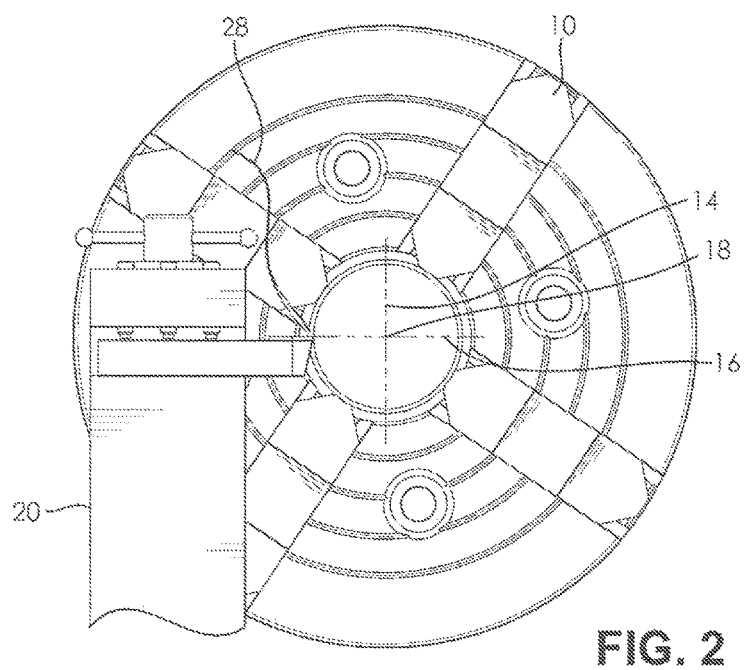
FIG. 2 illustrates an end view of the cylindrical part or work piece during machining, illustrating the outer diameter of the part and the desired finished diameter of the part.
Figure 20A:
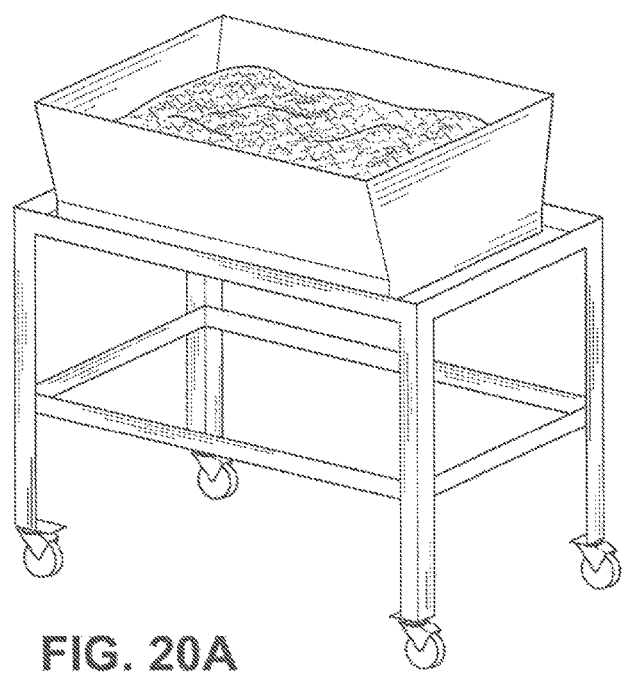
FIG. 20A is a perspective view of the prior art scrap produced.

FIGS. 1-2 illustrates a machining operation that produces one or more long chips 28. The cylindrical shaft or part 10 initially has an outer diameter 12. The vertical and horizontal center lines 14 and 16 respectively intersect at the center 18 of the part 10. In the machining operation, the tool holder 20 and insert 22 provided with the cutting edge 24 are brought into contact with the surface formed by the outer diameter 12 of the part 10, as part 10 is rotated in the counterclockwise direction as shown by arrow 26. The result of this machining operation produces long lengths of chips 28 which could interfere with the machining process. FIG. 20A shows the undesirable long chips produced by the prior art machining process. The part 10 has a desired finished diameter or surface 34. It should be appreciated that other configurations of the part 10 are contemplated. In some embodiments, the part 10 has a desired finished depth.

FIGS. 3-6 illustrate one embodiment of the EMS process. In this disclosure, like reference numerals designate like elements where appropriate and reference numerals with the addition of one-hundred or multiples thereof designate modified elements that are understood to incorporate the same features and benefits of the corresponding original elements. In this example, engineered interruptions or grooves 30 are provided in the outer surface 12 of the work piece or shaft 10. Although the work piece 10 is shown as a cylinder, it is to be understood that other shapes, materials and types of work pieces and components may benefit from the examples disclosed herein which are not limited to the design shown. Some other work pieces and components that may benefit from the examples disclosed herein including pulleys, axle tubes, axle shafts, transmission torque converters, and ring gears. The EMS process disclosed herein can also be adapted for deep hole drilling, wherein the drilling ground surface is comparable to the disclosed work piece, as well as other applications.

Figure 3:
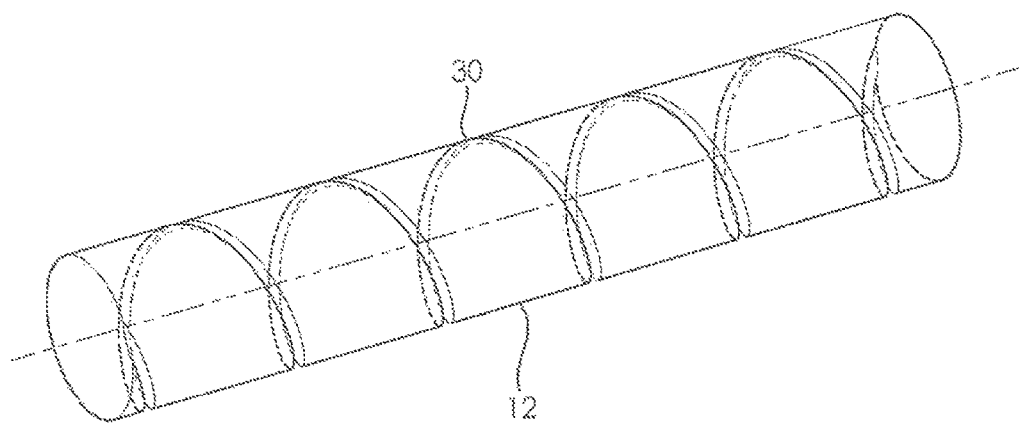
FIG. 3 illustrates one embodiment of an Engineered Machining Solution (EMS) process including a cylindrical part with the controlled interrupt illustrating the outer periphery with engineered interruptions.
Figure 4:
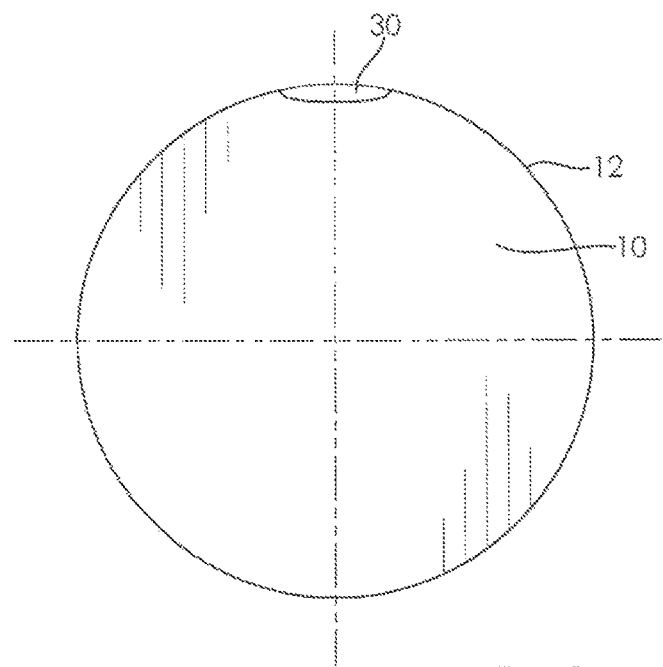
FIG. 4 illustrates a fragmentary enlarged end-view of the cylindrical part of FIG. 3, illustrating the center lines of the part with engineered interruption.
Figure 5:
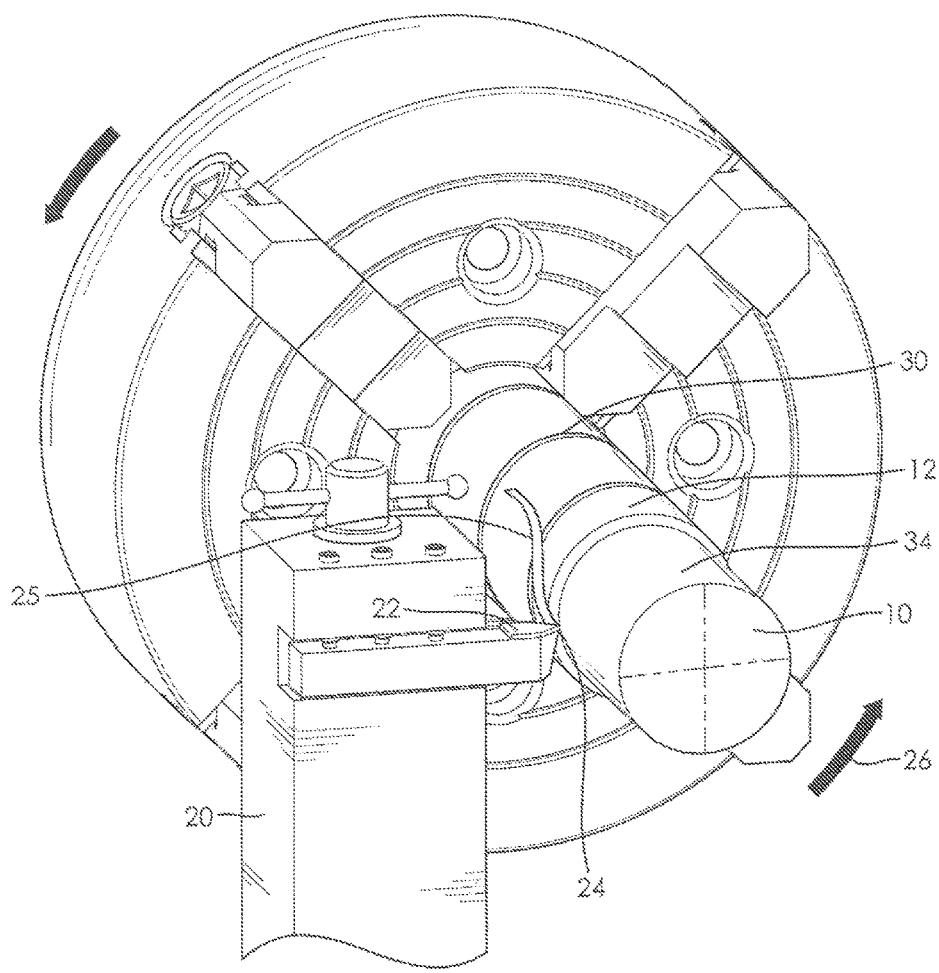
FIG. 5 illustrates a fragmentary view of the cylindrical part and the machining operation of FIG. 3, with the tool holder and insert of the machine tool removing material on the outer periphery to the desired finished diameter of the cylindrical part, with the engineered interruptions determining the desired lengths of the chips.

The engineered interruptions 30 are applied to the outer diameter 12 in a fashion as to reflect a spiral 30 to the work piece or shaft 10 as illustrate in FIG. 3. The number of interruptions and the revolutions or tightness of the spiral, as the work piece 10 is rotated, will determine the length of a chip formed when the shaft or work piece 10 is machined in a turning application. The application of the EMS process forms engineered grooves or interruptions 30 in the outer surface 12 of the work piece or shaft 10 as best illustrated in FIG. 4.

Figure 6:
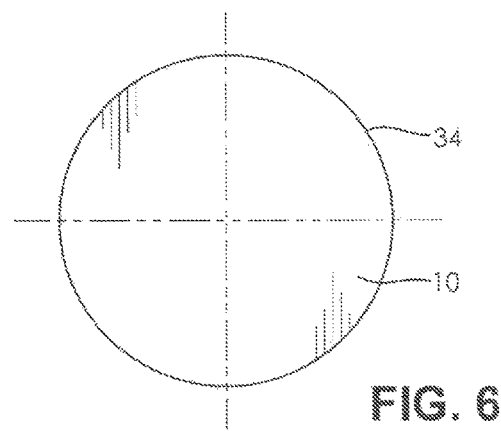
FIG. 6 illustrates an end-view of the cylindrical part of FIG. 3 after single pass machining operation.
Figure 7:
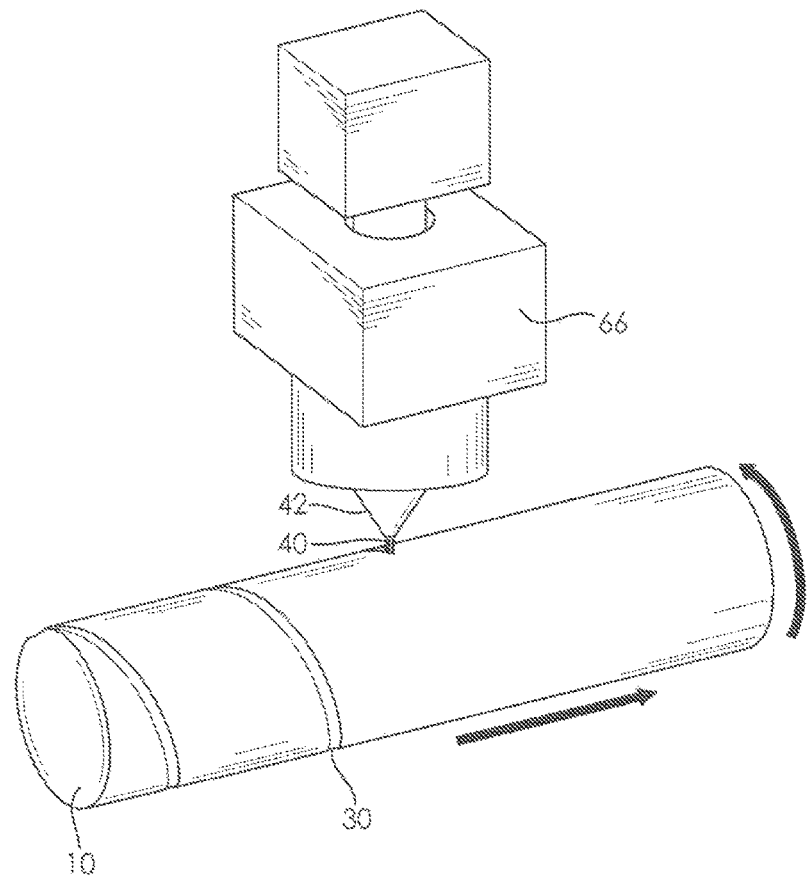
FIG. 7 illustrates a second embodiment of an EMS process including a fragmentary end-view of the cylindrical part prior to the finishing operation and illustrating the relationship between the laser head and beam and the outer periphery of the cylindrical part.
Figure 8:
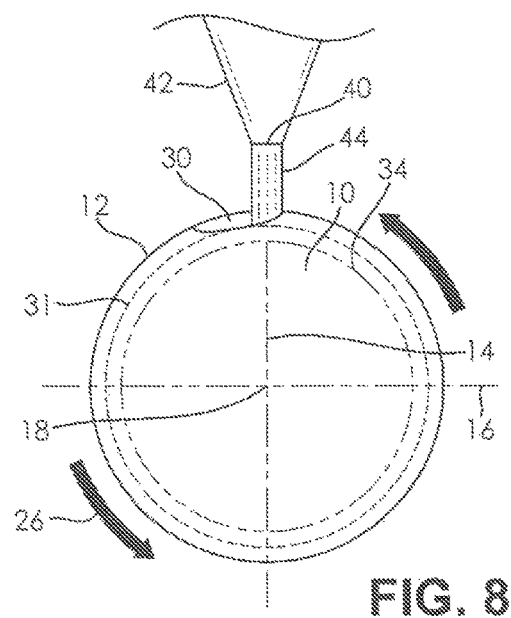
FIG. 8 illustrates an end-view of the cylindrical part of FIG. 7 showing the relationship between the cylindrical head and beam and the horizontal and vertical centerlines of the part and representing the use of the Control Depth of Laser Penetration process.
Figure 9:
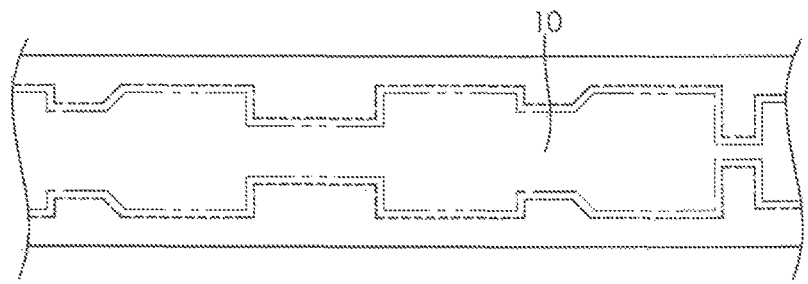
FIG. 9 illustrates an example of a finished part, unfinished part and the controlled laser depth as it applies to both.
Figure 10:
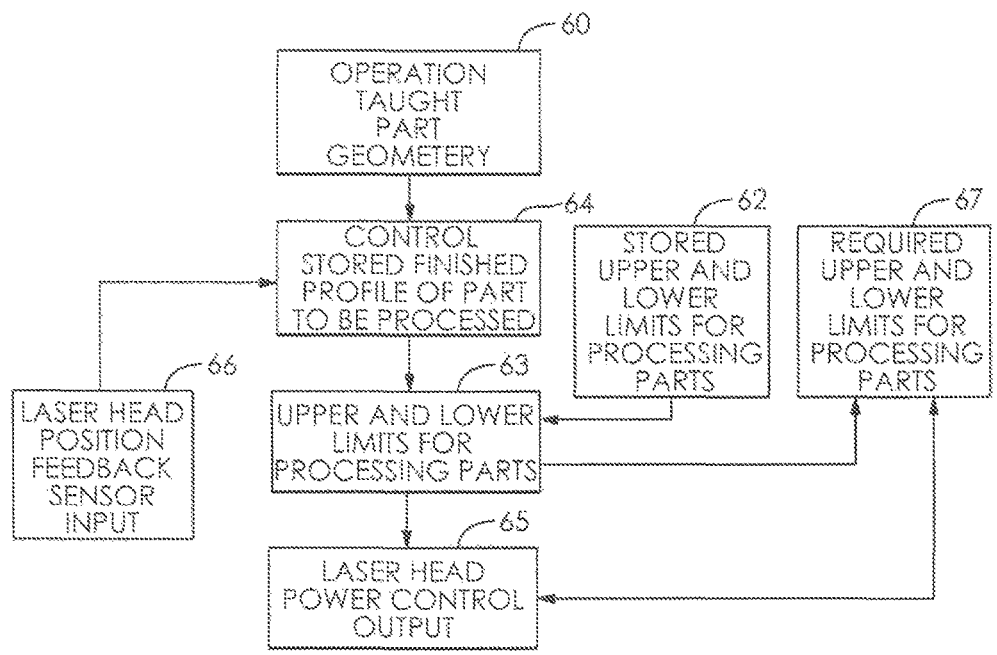
FIG. 10 illustrates a flow chart describing the applied approach to the control of the mechanism and laser as it applies to the part being processed.
Figure 20B:
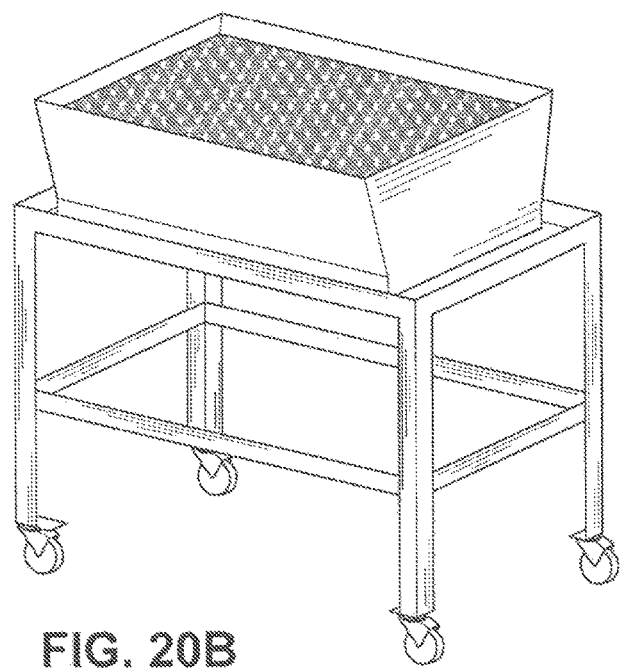
FIG. 20B is a perspective view of the scrap produced by the present invention.

To form the interruptions 30, a laser 40 is brought into contact with the outer diameter surface 12 as shown in FIG. 7. The laser is used to form the interruptions 30. Once the interruption or groove is formed the fool insert is used to complete the machining of the finished work piece. As the shaft 10 is rotated in the direction of arrow 26, the insert 22 cuts away the outer diameter 12 of the part 10 to form controlled-size chips 25 which are shorter in length than the chips 28 that would be formed without the interruptions. Thereafter, the machine fool passes through the interruptions 30 resulting in shearing action as the cutting edge 24 of the machine tool formed by the holder 20 and the insert 22 exits and re-enters the outer surface 12, thus reducing the stress on the machine tool. The grooves 30 provides a place where the chips break and results in chips of a short length. FIG. 20B shows the preferred short chips produced by the EMS system. Following behind the machine tool including the holder 20 and insert 22 is the desired finished surface 34, with the material between the interruptions 30 being completely removed from the shaft 10 thereby leaving no witness marks or material characteristic changes to the finished shaft or work object 10. As a result of the EMS process, the cylindrical shaft, work object or part 10 shown in FIG. 6 is machined to a desired depth exposing the finished surface 34. The EMS process allows the desired material to be completely removed from the part 10 leaving no witness marks or material characteristic changes.

Figure 14A:
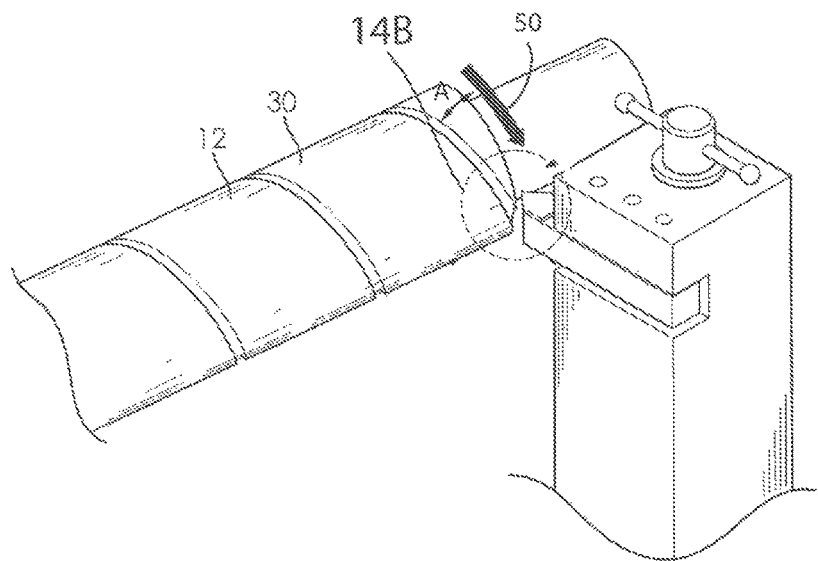
FIG. 14A is a partial perspective view of a piece being machined.
Figure 14B:
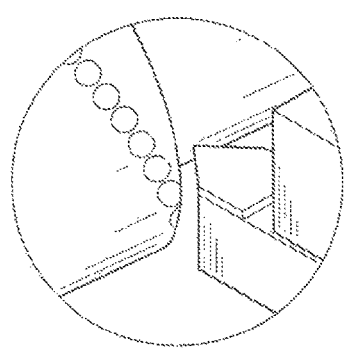
FIG. 14B is an exploded partial perspective view of the work piece being machined.
Figure 15:
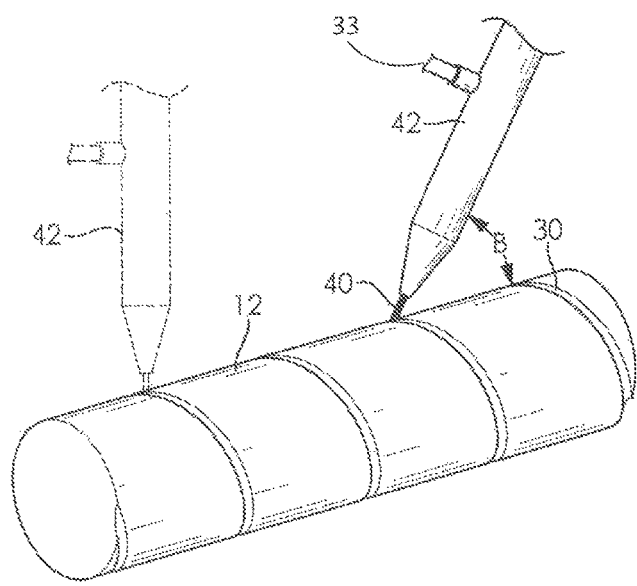
FIG. 15 is a partial perspective view of a piece to be machined.

As shown in FIG. 14 it has been found desirable to place the interruptions or groove 30 at an angle with respect to the path that is traveled by the cutting tool as shown by arrow 50. The interruptions are positioned at an angle A from about 10° to about 70° with respect to the direction of travel of the cutting tool or insert 22. The laser that is used to form the groove 30 can be pulsed to remove the material that forms the groove 30 and the rough surface of the item that is to be machined. The pulsing nature of the laser may result in a series of cuts in the rough surface of the material instead of a continuous cut to form the groove 30. As shown in FIG. 14 there are a series of individual cuts that have been made in the rough surface to form the groove 30. The individual cuts are positioned in adjacent relationship and this results in groove that effectively functions as a continuous groove that will break off shorter chips as the rough surface of the item is machined. The individual cuts are essentially drilled holes 31 that are in adjacent relationship. The holes that form the groove 30 are disposed at an angle with respect to the direction of machining and the cutting tool that does the machining will always see a continuous groove as the individual cuts overlap when the angle of the cutting fool is included in the calculation. The fact that the groove made of a series of cuts functions as a continuous groove reduces the impact on the cutting tool and produces long tool life and a better surface finish. The cuts are individual holes 31 formed by the laser are from about 0.002 of an inch to about 0.015 of an inch. In practice, it has been found preferable to have the hole be from about 0.0003 of an inch to about 0.005 of an inch. The individual holes 31 are essentially drilled holes with a controlled depth. Using this pulse laser drilling approach results in less hardening of the work piece. As shown in FIG. 15 it has been found to be preferable to orient the tip of the laser at an angle in relationship to the surface being machined. The laser does not cut through the material, but is only creating a groove in the rough surface of the item. The metal removed by the pulsing laser can blow back at the laser head while the laser head moves along the item. Most laser heads utilize a compressed gas to clean away molten material and to keep any hot metal from coming into contact with the protective lens that directs the laser beam onto the rough surface. The angler position of the laser head allows the compressed gas to blow the melted material away from the laser tip and this decreases the possibility that molten material will be directed back towards laser tip. In practice, if has been found desirable to have the laser tip disposed at any angle B from about 60 to about 80 degrees from the surface that is to be machined.

The compressed gas 33 that is utilized with the laser can be selected from the group comprised of compressed air, compressed nitrogen and compressed oxygen. Compressed air is usually the gas of choice as it is less expensive and readily available in the manufacturing industry. The use of compressed oxygen has demonstrated some advantages as it burns hotter and cleans the groove or scribe line more effectively. The compressed gas that is utilized as part of the laser scribing process can be selected to create the best results with the material that is being machined and the characteristics required for the finished product.

Frequently in machining operations coolant is used in the cutting machine to cool the cutting tool and also to thermally shock the metal that is being machined. The thermal shocking of the metal is important as this is utilized to break the metal into chips of a shorter length. The coolants that are utilized in the machining process are costly, need to be replenished frequently and add another process in the machining operation that must be maintained (and are not always effective). In addition, the scrap steel that is removed in the machining process has been contaminated with the coolant Most of the coolants that are utilized are considered to be toxic and need to be removed before the metal can be recycled. This significantly reduces the value of the scrap metal that is removed in the machining process. The interruptions or groove 30 utilize in the present invention are designed to create chips that have a shorter length and it has been found that in most EMS applications it is not necessary to use a coolant to shock the material that is being removed in the machining process. The elimination of the coolant reduces the complexity of the machining operation and results in scrap material that is more easily recycled and has a higher scrap value.

In FIG. 20 the machining industry the scrap metal collected from cutting machines is a by-product, that must be dealt with to have an efficient process. In the prior art cutting operations the material that is removed in the cutting operation tends to be removed in long somewhat continuous lengths. Removed material from these prior cutting operations tangle with one another in a process that is called nesting in the industry. The nested material from the cutting operation produces a product with large voids that takes up a great deal of space and that must be removed from the area where the cutting is taking place on a frequent basis. The nesting of the cut material also makes it more difficult to process the material in a recycling operation. The difficulty of separating the tangled metal strips makes it much more difficult to process and recycle the waste material that has been removed in the cutting operation. Frequently specialized tooling is utilized in the cutting industry to create chips that are of shorter length and that do not nest. The controlled chip design that is produced by the present invention, as shown in FIG. 20B, reduces or eliminates the need to special tooling that causes the chips to break in shorter lengths. This allow the use of less expensive cutting fools that have a longer effective life than the specialized tools that are frequently used.

Figure 18:
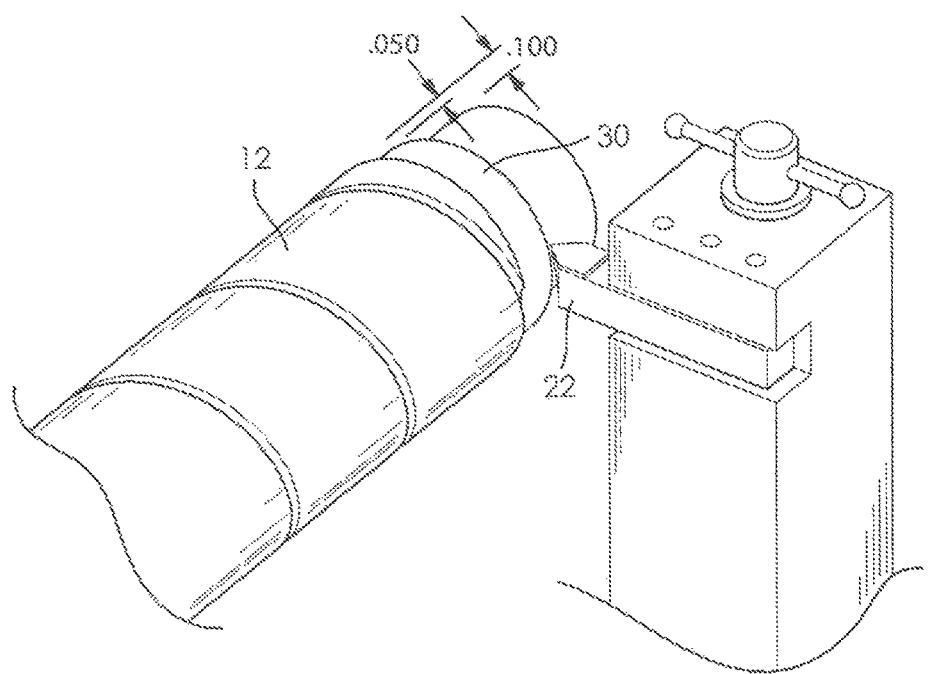
FIG. 18 is a perspective view of the machining of a work piece.
Figure 19:
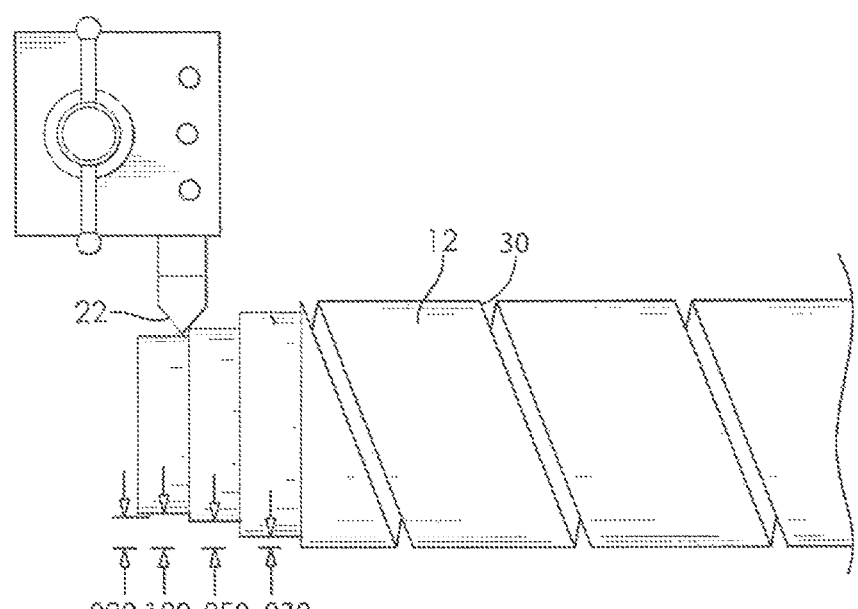
FIG. 19 is a perspective view of the machining of a work piece.

As shown in FIGS. 18 and 19 the groove 30 need only pass through a portion of the material that is to be removed to control the length of the chips that are formed in the machining operation. Through extensive testing it has been discovered that a scribe or groove 30 has a depth at least 50% of material being removed will function effectively to break the chips that are formed during the machining process. A groove 30 that has a depth of from about 25% to about 0.75% of the depth of the material that is being removed from the work piece will usually function to form chips of the removed metal. A depth for the groove 30 from about 40% to about 60% of the depth of the material being removed has been found to be preferred for most applications. The relationship between the depth of the groove and the material that is to be removed becomes more complicated if more than one pass is needed to remove the material to get to the desired finished surface. As an example, if it is necessary to use three passes to remove 0.100 of an inch of material the 50% rule requires that the groove be at least 50% of the last cut that is performed in the machining operation. If a first out of 0.050 of an inch is used and a second cut of 0.030 of an inch is then utilized with a finished cut of 0.020 of an inch made to create tire finished surface the groove will have to extend through the first and second cuts and at least through 50% of the last cut to effectively control the lengths of the chips that are produced in the machining process. Accordingly, it is necessary that the scribe or groove 30 extend through at least half of the material that is being removed in the last cut. As an alternative, it would be possible to form a groove 30 for each cut that is made to remove material from the rough surface of the item. This would be done usually if the quantity of material that is to be removed is extensive and several large cuts are necessary to get to the finished surface. The additional machining that is required to place a groove 30 in each cutting step would not be utilized unless there were unusual cutting operations necessary to get to the finished surface.

Figure 21:
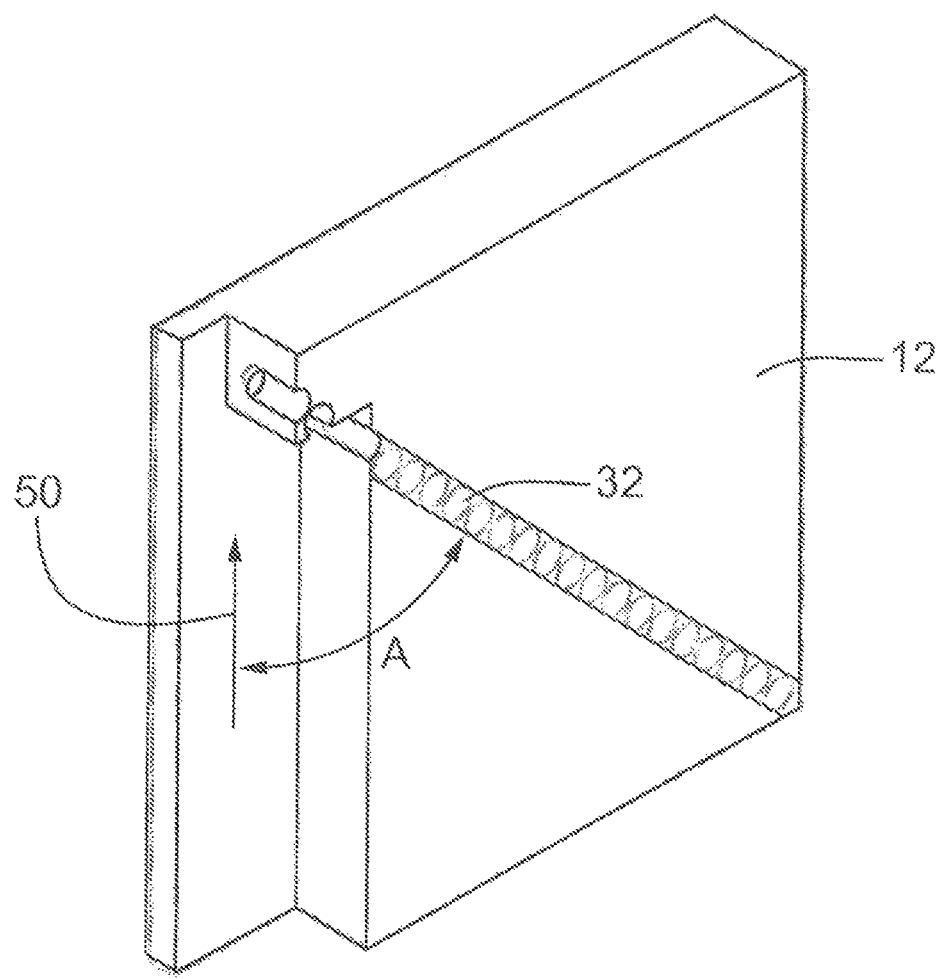
FIG. 21 is a perspective view of another feature of the invention.

As shown in FIG. 21 for some work pieces, the laser can be used to create a heat effected zone 32 of the surface of the work piece 12. The heat effected zone created by the laser creates a hardness in the work piece in the area 32 and this localized change in the property of the work piece will cause chips to break when the cutting tool reaches the heat effected zone 32. In some applications it may be preferable to include a groove 30 in the heat effected zone, but the groove 30 usually would not have to be as deep because of the natural changes produced by the heat effected zone 32. It is also believed that the formation of smaller chips more quickly removed the machined material from the work piece 12 and reduces the heat created in the work piece from the machining operation. The use of a laser to form the groove 30 or heat effected area 32 does not place a load on the work piece as there is no mechanical force or load applied to the work piece. If a cutting fool is brought against the work piece to form the groove, there is a mechanical force or load that is applied to the work piece. Such loads can cause deformation of the work piece and complicate the machining operation that is used to produce a finished part. The use of the laser avoids these complications.

FIGS. 7-10 illustrate a further example of an EMS process including a Real Time Depth Measurement (RTDM) feature. The intersection of the vertical and horizontal axis 14 and 16 is the center 18 of the work object of shaft 10 which establishes the datum coordinates for measurement of the travel distance of a tip 40 and a sensing cone 42 of a laser head 66. The tip 40 and sensing cone 42 determine the operating parameters of a laser beam or scribe 44. The feeding of the cutting head and sensing over the shaft of the work object 10 is to maintain consistent and desired depth of laser penetration of the laser beam 44 to the finish surface 34 in fashion to provide an engineered interruption 30 in the shaft or work object 10.

The process heretofore described are disclosed for controlling the length of chips or shavings of removed material 28 from a work piece 10 that is inherent to produce long undesired chips when machined Based on the work piece or shaft 10 configuration and the surface area 12 to be machined a determined outlay and process application for a continuous scribe or arrangements of different scribe pattern or patterns for the part or surface is selected to provide optimal chip control during machining operation. The expression used is "engineered interruption" 30 applied to the work object of work piece 10 prior to the machining operation to maximize optimal chip control. By utilizing a laser to change or rearrange material properties and or remove material in selected areas (e.g., engineered interruption 30) to manipulate the chip 28 to sever at those selected points. The machine tool 20, 22, 24 (FIG. 5) passes through the intersecting break point 30 in a shearing fashion to reduce stress to the machine tool 20, 22, 24 (FIG. 5) so as not to cause premature tool failure. The machine tool produces controlled-sized chips 25 (FIG. 5) during the machine turn 26 operation. When applicable, reduced shearing action and more favored direct interface and less shearing of machine fool 20, 22, 24 (FIG. 5) to applied process is also acceptable. This disclosure teaches that through the utilization of RTDM, the controlling of the depth of the scribe 30 of the laser is accomplished through the interface of hardware 40, 42, software and electronics. The surface area 12 to be treated or affected, is measured continuously during the application of the laser power to increase and decrease so that the application of the process can maintain a consistent and accurate desired depth of penetration 30 of the laser to the work outer surface 12 object or part 10.

The sensing cone or sensor assembly 42 detects the distance of an electrical signal reflected off the outer surface 12 of the work piece 10. The distance sensing cone 42 is calibrated so that a change in the sensor output indicates a change in the distance to and from the material of the outer surface or diameter 12 of the part 10. The distance between the tip 40 and the work piece 10 is referred to as the gap or a tip stand-off. The distance sensing cone 42 seeks to maintain a constant distance/gap/stand-off with respect to the work piece 10.

Figure 13:
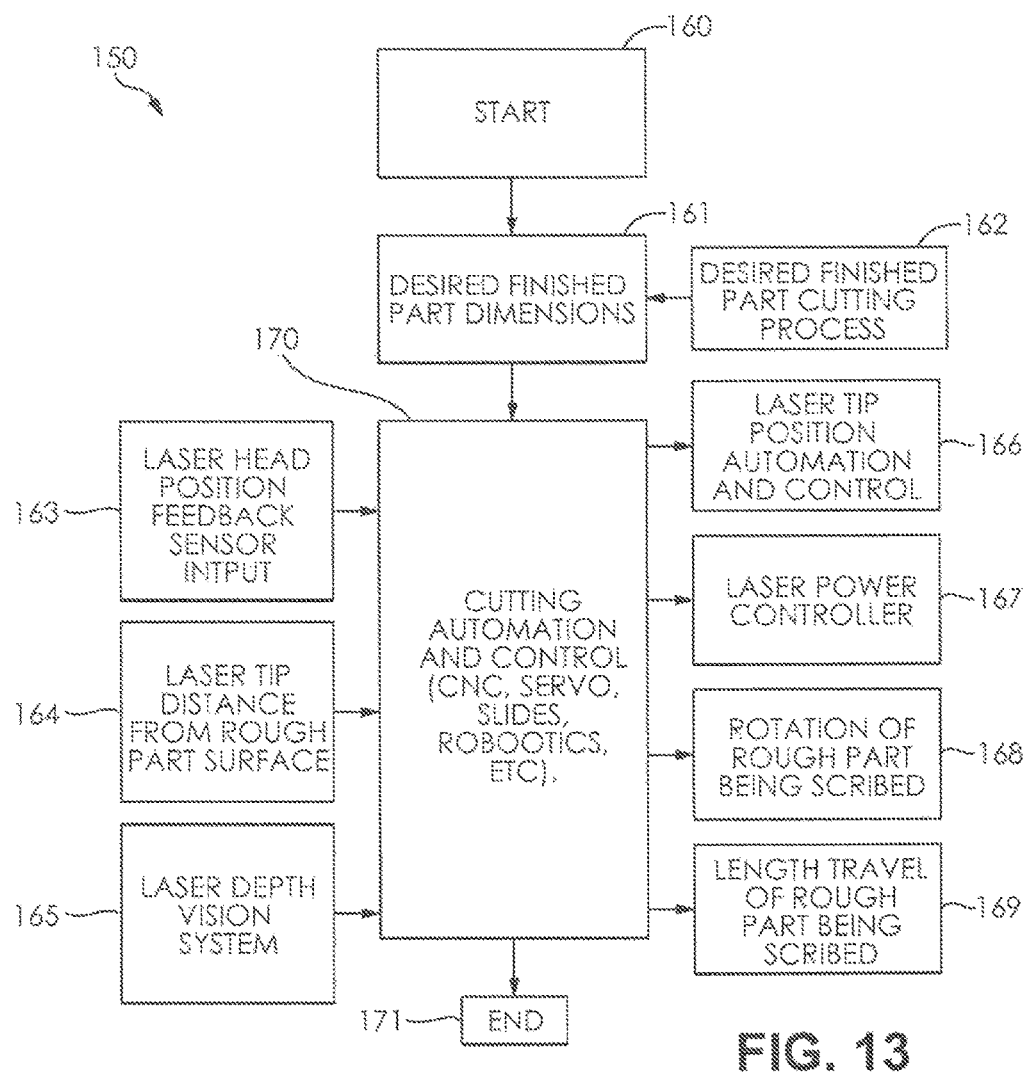
FIG. 13 illustrates a flow chart describing the applied approach to the control of the mechanism and laser as it applies to the part being processed by the system of FIG. 11.

FIG. 13 illustrates a flow chart for the RTDM feature. By utilizing the data 60 of the desired part to be machined it is programmed into the central control system. The central control system stores the data to reference continuously while the laser and its motion are being controlled. After the data has been stored, upper and lower control limits 62 are also stored. These are monitored as the sensing cone 42 of the laser passes over the part 10. If these limits 62 are exceeded, the EMS process will be halted and the product Will need to be removed. This will assure that the proper application of the EMS is achieved. Once the data has been loaded the proper position 63 and power control 65 of the laser head 66 are achieved. To assure that the finished product will be processed, the actual position 66 and the desired output 63 are continuously compared with the calibrated datum 64 of the part. Additionally, the complete process may be recorded 67 from part to part. This will help with historical changes in the process that may affect proper operation over time.

Figure 16A:
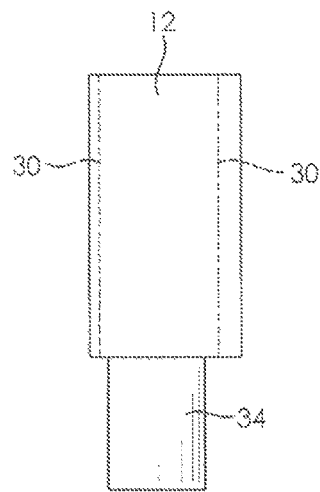
FIG. 16A is a side elevational view of a work piece.
Figure 16B:
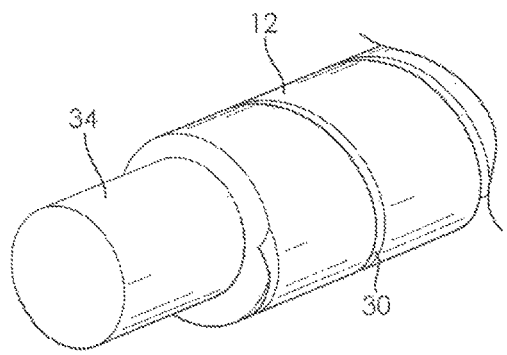
FIG. 16B is a perspective view of the work piece.
Figure 17A:
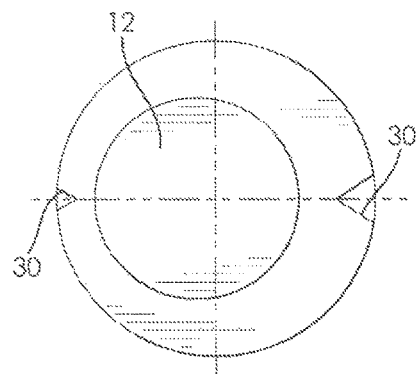
FIG. 17A is an end view of a work piece.
Figure 17B:
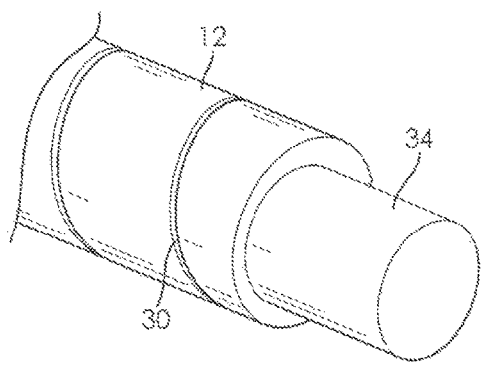
FIG. 17B is a perspective view of a work piece.

A special feature of the chip control automation process is its ability to detect uneven surfaces that are present on the raw part prior to machining Parts in the raw state are frequently out of center with regard to the finished part. The relationship between the laser 40 and the holding fixture 10 are calibrated to be a known disk as shown in FIG. 16 the laser head 42 knows when the unfinished surface is closer or farther away from the center point of the holding fixture 10. By knowing the distance to the finished part center point the laser 40 can be controlled by its power setting or the speed at which it moves to create a groove 30 that has a depth that is appropriate for the amount of material that is to be removed from each section of the item that is to be machined. As shown in FIG. 16, the depth of the scribe or groove 30 can be varied to accommodate the varying thickness of the material that is be to be removed to form the finished part.

Figure 11:
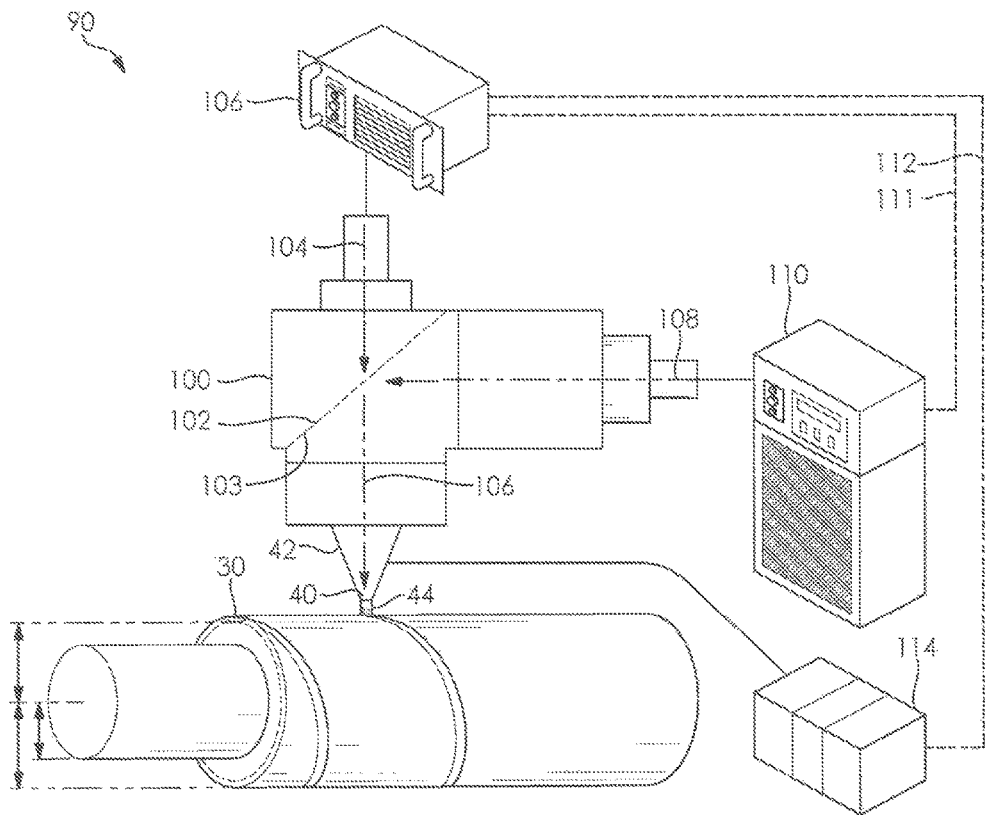
FIG. 11 illustrates a schematic view of a third embodiment of an EMS process.
Figure 12:
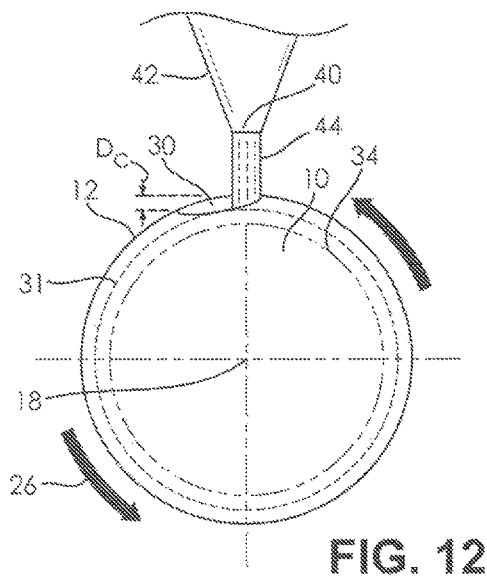
FIG. 12 illustrates an end-view of a cylindrical part incorporating the embodiment from FIG. 11.

FIGS. 11-13 illustrate a further example of an EMS process including a Real Time Depth Measurement (RTDM) feature. In this embodiment, the machining system measures the depth of a laser or energy beam as it cuts a part or work piece to form the engineered interruption 30. FIG. 11 illustrates a schematic view of a machining system 90 configured to implement the BUS process including the RTDM feature. The machining system 90 includes a laser delivery system 108 having a laser head assembly 100 for transmitting a laser beam onto a surface of the work piece 10. The laser head assembly 100 includes an optical system 102 configured to receive the laser beam emitted by a laser generation device 110. The optical system 102 orients the laser beam onto an unfinished surface at the outer diameter 12 of the work piece 10. As shown, the work piece 10 has a cylindrical configuration. However, various shapes, dimensions and materials of the work piece are contemplated, including work pieces with generally planar or uneven surfaces.

The machining system 90 includes a laser camera controller 106 for monitoring a cutting depth of the laser beam. The laser head assembly 100 includes a measurement system 104 configured to receive an incoming signal generated by the laser camera controller 106 and transmit the incoming signal through the optical system 102 and onto a surface of the work object 10. In some embodiments, the optical system 102 includes an emitting surface 103 that allows the incoming signal defined by a first frequency to pass there through, but reflects the laser beam defined by a second frequency different from the first frequency. Thus, the optical system 102 allows both the measurement system 104 and laser delivery system 108 to operate simultaneously in a compact arrangement. The laser camera controller 106 is also configured to send a power feedback signal 111 to a laser generation device 110, the power feedback signal 111 being associated with a desired penetration depth signal. The cutting machine automation controller 114 may be any number of systems, including CNC, robotics, and servo slides, operable to position the work piece 10 relative to the tip 40 of the laser head assembly 100. It should be appreciated that the laser camera controller 106 may be substituted or augmented by other devices capable of measuring a distance between the device and a surface of another object. For instance, the controller 106 may include a digital, optical electro-optical, or laser component capable of measuring a distance.

Referring to FIGS. 12-13, the machining system 90 (FIG. 11) operates as follows. The EMS process 150 including a RTDM feature is shown in FIG. 13, and begins at step 160. The machining system 90 (FIG. 11) is configured to include at least one desired finished part dimension at step 161. In particular, one of the desired finished part dimensions includes a desired cutting depth 31 (shown in FIG. 12) of the engineered interruption 30 to be formed on the work object 10, which is provided at step 162. In some embodiments, the desired cutting depth 31 is based upon a heat affected zone (HAZ) of the laser beam emitted onto a surface of the work object 10, thereby minimizing the likelihood that the beam or the resultant HAZ may penetrate the finished part surface 34, which may cause the hardness level the finished part surface 34 to be undesirably affected.

The cutting machine automation controller 114 performs cutting automation during step 170. At step 163, the sensing cone 42 monitors the distance between the tip 40 and the unfinished surface 12 of the work object 10, and the provides a position feedback signal 112 to the cutting machine automation controller 114 to adjust the laser tip position at step 166. The cutting machine automation controller 114 may cause the work object 10 to rotate relative to the laser head assembly 100 about the center 18 of the work object 10 at step 168 and may cause the laser head assembly 100 to move in an axial direction relative to the work object 10 at step 169.

The RTDM feature is shown at step 165. The laser camera controller 106 sends an incoming signal to the measurement system 104, which is then passed info the engineered interruption 30 being formed on the work piece 10. The surface of the engineered interruption 30 reflects the incoming signal back toward the laser camera controller 106, which defer mines a current cutting depth Dc (shown in FIG. 12) extending between the unfinished surface 12 and an intermediate surface of the engineered interruption 30. Thereafter, the laser camera controller 106 sends a power feedback signal 111 to the laser generation device 110, based upon the current cutting depth Dc. The laser generation device 110 may adjust an intensity level of the laser beam emitted by the laser generation device 110 onto the work piece 10. Additionally, the laser camera controller 106 may send the position feedback signal 112 to the cutting machine automation controller 114 to adjust the relative position of the laser head assembly 100 with respect to the work object 10. Thus, the RTDM feature may adjust a desired level of penetration of the laser beam to ensure that the current cutting depth Dc does not exceed the desired cutting depth 31. In another embodiment, a desired cutting depth may be based upon the centerline 18 of the work object 10. Generally, the EMS process ends at step 171, and thereafter a secondary machining process is commenced. The insert 22 outs away the outer diameter 12 of the work piece 10 to form the controlled-sized chips 25, to define the desired finished surface 34.

The Real Time Depth Measurement (RTDM) feature provides many benefits over conventional machining processes. In conventional methods, the beam or the resultant HAZ may penetrate the finished part surface, undesirably affecting the hardness level the finished part surface. Thus, the RTDM minimizes the practice of including a safety margin within the cutting depth to assure the finished part is not affected by a HAZ or excessive cutting depth. Destructive testing, which is typically required to verify a material hardness of the finished work piece to ensure a standard of quality, is minimized or rendered unnecessary. By coordinating the feedback during the cutting operation the RTDM feature assures that no witness marks from the laser or its HAZ will be left after the finished part has been machined. The RTDM feature ensures repeatable performance of the EMS process, even with variable part geometries and metallurgy.

The preceding description is exemplary rather than limiting in nature. Variations and modifications to the disclosed examples may become apparent to those skilled in the art that do not necessarily depart from the essence of this disclosure.

We claim:
1. A machining system comprising:
a device operable to emit an energy beam toward a surface of work piece, the energy beam disposed for making a first cut in the surface of the work piece, the energy beam making the first cut in a spiral orientation along the work piece and having a defined space between adjacent spiral sections of the first cut;
a depth measurement system configured to detect real-time cutting depth of the energy beam and provide a feedback signal of said real-time cutting depth; and
a cutting tool disposed adjacent the work piece for making a second cut for removing material from the work piece, the second cut being adjacent to where the energy beam has made makes the first cut in the surface of the work piece, the depth of the first cut made by the energy beam being controlled by adjusting the position of the energy beam with respect to the work piece or the power supplied to the energy beam in response to the feedback signal from the depth measuring system, the depth of the first cut being from about 40% to about 60% of the depth of the second cut that removes material from the work piece, the first cut creating interruptions in the work piece that cause the material removed from the work piece by the cutting tool to break into pieces of a desired length, the size of the defined space determining the desired length of the pieces.

2. The system of claim 1 wherein the energy beam is a laser beam.

3. The system of claim 2 wherein the laser beam is a pulsed laser.

4. The system of claim 3 wherein a camera is disposed adjacent the laser beam, the camera being directed towards the work piece, the camera being disposed to check the depth of the cut made by the laser beam.

5. The system of claim 2 wherein a laser tip directs the laser beam towards the work piece, the laser tip and laser beam being disposed at an angle with respect to the work piece.

6. The system of claim 5 wherein the laser tip is disposed at an angle from about 60° to about 80° with respect to the work piece.

7. The system of claim 1 wherein the cut made by the laser beam is disposed at an angle with respect to a direction of material removal made by the cutting tool.

8. The system of claim 7 wherein the angle is from about 10° to about 70°.

9. The system of claim 8 wherein the cut made by the laser beam is greater than ½ of a depth of the material removed from the work piece by the cutting tool.

10. The system of claim 9 where a source of fluid under pressure is positioned adjacent the laser beam, the source of fluid under pressure being disposed direct the fluid toward the cut made by the laser beam.

* * * * *

UNITED STATES PATENT AND TRADEMARK OFFICE
CERTIFICATE OF CORRECTION

PATENT NO. : 10,092,976 B2
APPLICATION NO. : 14/469145
DATED : October 9, 2018
INVENTOR(S) : Daniel T. Green and Richard M. Zyla Page 1 of 1

It is certified that error appears in the above-identified patent and that said Letters Patent is hereby corrected as shown below:

In the Claims

In Column 10, Line 15 please delete "makes".

Signed and Sealed this
Eleventh Day of December, 2018

Andrei Iancu
*Director of the United States Patent and Trademark Office*